United States Patent
Joos et al.

(10) Patent No.: US 9,458,809 B2
(45) Date of Patent: Oct. 4, 2016

(54) METHOD FOR ASSESSING AN INJECTION BEHAVIOUR OF AT LEAST ONE INJECTION VALVE IN AN INTERNAL COMBUSTION ENGINE AND OPERATING METHOD FOR AN INTERNAL COMBUSTION ENGINE

(75) Inventors: Klaus Joos, Walheim (DE); Werner Hess, Stuttgart (DE); Andreas Koch, Loechgau (DE); Ruben Schlueter, Yokohoma (JP); Holger Rapp, Ditzingen (DE); Haris Hamedovic, Moeglingen (DE); Joerg Koenig, Stuttgart (DE); Harry Friedmann, Vaihingen an der Enz (DE); Achim Hirchenhein, Trierweiler (DE); Christoph Heisen, Munich (DE); Christian Reschke, Leonberg (DE); Stephanie Wirth, Malmsheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 235 days.

(21) Appl. No.: 14/346,283

(22) PCT Filed: Aug. 6, 2012

(86) PCT No.: PCT/EP2012/065341
§ 371 (c)(1),
(2), (4) Date: Jul. 11, 2014

(87) PCT Pub. No.: WO2013/041293
PCT Pub. Date: Mar. 28, 2013

(65) Prior Publication Data
US 2014/0318227 A1    Oct. 30, 2014

(30) Foreign Application Priority Data
Sep. 20, 2011 (DE) ........................ 10 2011 083 033

(51) Int. Cl.
*G01M 15/04* (2006.01)
*F02M 65/00* (2006.01)
(Continued)

(52) U.S. Cl.
CPC .......... *F02M 65/001* (2013.01); *F02D 41/221* (2013.01); *F02D 41/402* (2013.01);
(Continued)

(58) Field of Classification Search
CPC ............. F02D 41/2467; F02D 41/247; F02D 2041/2055; F02D 41/221; F02D 2200/0618; F02M 65/00; F02M 65/001; F02M 65/005; G01M 15/042
USPC ...................................................... 73/114.45
See application file for complete search history.

(56) References Cited

U.S. PATENT DOCUMENTS 7,881,857 B2 * 2/2011 Samenfink .......... F02D 41/1454
                                                  123/299
7,930,089 B2 * 4/2011 Askew .................... F02D 41/20
                                                  123/490

(Continued)

FOREIGN PATENT DOCUMENTS

CN       101300416 A      11/2008
DE       102005051701      5/2007

(Continued)

OTHER PUBLICATIONS

International Search Report for PCT/EP2012/065341, issued on Dec. 19, 2012.

*Primary Examiner* — Freddie Kirkland, III
(74) *Attorney, Agent, or Firm* — Norton Rose Fulbright US LLP

(57) ABSTRACT

A method for assessing an injection behavior of at least one injection valve of an internal combustion engine includes putting the internal combustion engine into a special operating mode defined by control parameters and operating the engine in the special operating mode during a diagnostic time period, at least one operating parameter of the internal combustion engine being determined at least during the diagnostic time period, and at least one quantity characterizing the injection behavior of the at least one injection valve being evaluated at least during a segment of the diagnostic time period and being evaluated on the basis of the at least one operating parameter.

14 Claims, 3 Drawing Sheets

(51) Int. Cl.
 *F02D 41/22* (2006.01)
 *F02D 41/40* (2006.01)
 *F02D 41/24* (2006.01)

(52) U.S. Cl.
 CPC ........ *G01M15/042* (2013.01); *F02D 41/2438* (2013.01); *F02D 41/2458* (2013.01); *F02D 2200/0618* (2013.01); *F02D 2200/702* (2013.01); *Y02T 10/44* (2013.01)

(56) References Cited

U.S. PATENT DOCUMENTS

| | | | |
|---|---|---|---|
| 8,755,988 B2 * | 6/2014 | Parrish | F02D 41/2419 123/299 |
| 8,775,058 B2 * | 7/2014 | Hauser | F02D 41/008 123/480 |
| 2009/0005955 A1 | 1/2009 | Askew | |
| 2015/0122000 A1 * | 5/2015 | Willimowski | F02M 51/00 73/114.45 |

FOREIGN PATENT DOCUMENTS

| | | |
|---|---|---|
| DE | 102008002901 | 1/2009 |
| DE | 102009002483 | 10/2010 |
| DE | 102009045469 | 4/2011 |
| EP | 2469064 | 6/2012 |
| JP | 05272377 A | 10/1993 |
| JP | 2001280189 A | 10/2001 |
| JP | 2006002698 A | 1/2006 |
| JP | 4148128 B2 | 9/2008 |
| JP | 2009513864 A | 4/2009 |
| JP | 4274131 B2 | 6/2009 |
| JP | 4353270 B2 | 10/2009 |
| JP | 2011186543 A | 9/2011 |
| WO | 2010076645 A1 | 7/2010 |

* cited by examiner

METHOD FOR ASSESSING AN INJECTION BEHAVIOUR OF AT LEAST ONE INJECTION VALVE IN AN INTERNAL COMBUSTION ENGINE AND OPERATING METHOD FOR AN INTERNAL COMBUSTION ENGINE

FIELD OF THE INVENTION

The present invention relates to a method for assessing an injection behavior of at least one injection valve of an internal combustion engine, and to an operating method for a corresponding internal combustion engine.

BACKGROUND INFORMATION

Internal combustion engines having direct fuel injection into the combustion chamber via corresponding (high-pressure) injection valves, and having engine control devices for realizing different operating modes and/or multiple injections or injection sequences per working cycle (e.g. in the form of double or multiple injections), have long been known.

Such combustion methods require a high degree of metering precision on the part of the injection valves, i.e. of the quantity of fuel injected by these valves, in order to enable the exploitation of all advantages of corresponding technologies. This is true above all for multiple injections of very small quantities, which are used above all for starting, for warm running, and for the heating up of catalytic converters. Increasing injection pressures, together with multiple injections, also result in higher demands on the metering precision of injection valves.

The required metering precision, in particular for very small quantities, can be realized only using special methods in which in each case a precise knowledge of the injection behavior of the participating injection valves is required.

From the existing art, it is known to store characteristic quantities of the injection valves in a pre-controlling device, in the form of application parameters. A characteristic, which here reproduces a relation of an injected quantity to the valve controlling duration, is almost linear in the region of longer control durations. This relates above all to the so-called full stroke range in which the injection valve is completely open during the injection process. In the region of smaller control durations, in contrast, there is a significant deviation from linearity. The metering precision decreases significantly in connection with a significant increase in the production spread if the control duration is reduced far enough that the injection valve no longer opens completely, or does so only very briefly.

From German Published Patent Appln. No. 10 2005 051 701, a method is known that makes it possible to describe a deviation of the behavior of an injection valve from the linear relation between control duration and injection duration. For this purpose, test injections are carried out whose durations are first still in the linear range of the mentioned characteristic. The quantity of fuel injected in the context of a regular injection is here reduced by the fuel quantity injected in the context of the measurement injection, in order to avoid influences on the quiet engine running and other disadvantageous effects. The effect of the injections is evaluated by evaluating the air number lambda, i.e. at the engine output side and indirectly. With increasing reduction of the duration of the test injections, a deviation from the linear behavior can be detected via a deviation from the air number that is expected in the case of linearity.

However, there continues to be a need for improved possibilities for assessing the injection behavior of injection valves during engine operation that supply more precise and more reliable results.

SUMMARY

According to the present invention, against this background a method is proposed for assessing the injection behavior of at least one injection valve of an internal combustion engine, and an operating method is proposed for a corresponding internal combustion engine. A computing unit according to the present invention, e.g. a control device of a motor vehicle, is set up, in particular in terms of programming, to carry out a method according to the present invention.

In order to assess the injection behavior, an internal combustion engine is put into a special operating mode defined by control parameters, and is operated in the special operating mode during a diagnostic time period. At least during the diagnostic time period, operating parameters of the internal combustion engine are determined. Here, at least one additional injection can be made in addition to the injections used in regular engine operation (also referred to as "regular injections" in the following). Quantities characterizing the injection behavior are acquired at the valve at least during a segment of the diagnostic time period, and if an additional injection is made are acquired in particular during this additional injection, and are evaluated on the basis of the operating parameters.

Through the acquisition at the valve and evaluation of the quantities characterizing the injection behavior, also referred to in the following as "valve diagnosis," a behavior of a corresponding injection valve can be acquired much more reliably than via the evaluation at the engine output side of the air number lambda, known from the existing art. The specific setting of the control parameters not only provides constant, reproducible conditions, but can also, as described below, also create specific conditions that enable a corresponding valve diagnosis much more quickly and reliably.

The named operating conditions include, inter alia, the voltage of the vehicle electrical network, a rail pressure, an injection and/or cylinder counterpressure, the injection pattern used, the pause time(s) between injections, the fuel or fuel type, the operating mode of the internal combustion engine, the torque reserve thereof, as well as temperatures, e.g. of the engine, fresh gas, exhaust gas, fuel, and injection valve, as well as engine load and engine rotational speed. These are therefore both control parameters with which the engine can be controlled in a targeted fashion and that then, as explained below, define a special operating mode, and also influencing factors that are not set deliberately but that can be determined at least at times during the diagnostic time period.

In particular, here the type of fuel used can be important; this includes e.g. the respective quantity portions of (bio) diesel, gasoline, ethanol, etc.

Thus, a "special operating mode" is defined by the targeted setting of particular control parameters, in particular by a defined rail pressure or injection pressure and/or a defined injection pattern with at least two partial injections, in particular a pre-injection and a main injection. Such a special operating mode can include the use of application-related parameters, i.e. for example control parameters that are not optimal with regard to consumption, noise, or efficiency, but that are advantageous from the point of view of diagnosis, and that enable a diagnosis with increased reliability. As its name indicates, this is not a regular or normal operating mode.

A special operating mode is therefore distinguished for example in that it is calibrated to optimal measurement conditions in order for example to carry out a rapid measurement or diagnosis. During idling operation, a vehicle is for example operated with a rail pressure of 40 bar. Because an informative assessment of an injection behavior however also requires measurements at other pressures, in the context of the method according to the present invention corresponding other pressures are provided for a short time, i.e. for the duration of the respective assessment, using a coordinator or control device. These other pressures are certainly not optimal from the point of view of application, but yield optimal results from the point of view of measurement technology. On the basis of these measurements, the end result is that in regular operating mode an advantageous operation can be achieved that can be based on the information determined during the special operating mode.

The measures according to the present invention support, via a specific controlling of the internal combustion engine using the control parameters, the measurement or diagnosis of the injection valves during the operation of the internal combustion engine, and enable, through the acquisition and/or setting of defined operating conditions, a rapid measurement with high quality. Here, through the targeted approach to operating points under defined control parameters and influencing factors, cross-influences can be taken into account, influenced, and/or screened out in a targeted manner.

Through the special operating mode, a measurement of the injection valves, and an assessment of the injection behavior, is enabled in connection with corresponding diagnostic methods under defined boundary conditions. The special operating mode permits, in connection with such defined operating conditions (for example pressure and temperature), a significantly increased recognition quality, because quantities that influence the individual valve injection can be taken into account or screened out in a targeted manner.

Through the targeted setting of control parameters, in other words the forcing of defined boundary conditions, the special operating mode enables a targeted correction of the influences (e.g. rail pressure, fuel temperature, fuel, or injection pattern) on the metering of the injection valve. In addition, a speed advantage can be achieved up to the presence of loadable valve-individual control correction values, if targeted sequences or boundary conditions are required for a particular time duration for particular diagnostic methods. Thus, particular diagnostic methods, such as those explained below, require, with a particular frequency, defined control durations or control sequences. In normal engine operation, it may be a very long time before such operating conditions occur accidentally, or such operating conditions may never occur randomly. For example, in corresponding diagnostic methods, sequences of defined control durations may be required having a defined number of repeated measurements and defined injection positions, which can be provided quickly by the special operating mode.

Particularly advantageously, control parameters can for example include a particular injection pattern in which additional injections are made. In a particularly advantageous realization, the injection quantities of these additional injections are subtracted from the overall quantity of the regular injections (here designated "regular injection quantity"), so that the overall injected quantity does not change. In a further particularly advantageous realization, the additional injections are always made only to those cylinders whose injection valve(s) can also be measured. The additional injections can be specified as control durations in connection with a subsequent calculation of the associated fuel masses. Alternatively, additional injections can be specified on the basis of fuel mass specifications.

Diagnostic methods for assessing the injection behavior of injection valves are known for example from German Published Patent Appln. No. 10 2009 045 469, and from German Published Patent Appln. No. 10 2009 002 483, and profit in a particular manner from the above-explained special operating mode. An explained special operating mode can also be advantageous for other diagnostic methods. For example, an evaluation of the air number lambda can be made much more reliably if defined fuel pressures are set and/or used for evaluation in connection with defined fuel temperatures or valve temperatures.

As diagnostic methods for the injection valve or valves, a method can advantageously be used in which a first valve delay time is determined and, on the basis of a correlation of this with a second valve delay time, the second valve delay time can be determined. In injection valves, an opening delay time and a closing delay time can occur as valve delay times. In this context, the opening delay time is the time between the beginning of the supply of current to a valve actuator and the time from which a movable element, e.g. a valve ball, is actually set into motion. The closing delay time designates the time between the time at which the supply of current is stopped and the time at which the movable element has again assumed its rest position.

In many conventional valve types, the closing delay time can be determined relatively simply from operating quantities of the valve or of the actuator installed therein. For example, in the case of an electromagnetic actuator an evaluation of the actuator current, or of the actuator voltage, can be used to determine the closing delay time (see below). In contrast to this, in standard valve types it is normally more difficult to determine an opening delay time using such measurement methods. However, because there exists a correlation between closing delay time and opening delay time, corresponding inferences can be made concerning the opening delay time from the closing delay time, so that measurement methods are not necessary for the determination of the opening delay time.

The application of a corresponding method is particularly advantageous in a ballistic operating range of an injection valve, which is characterized in that at least one movable component of the valve, e.g. a valve needle, carries out a ballistic trajectory.

The first delay time, e.g. the closing delay time, need not for its part be determined by a measurement, but rather can be derived via a control duration. Likewise, it is possible to determine the second delay time as a function of a minimum value for the first delay time, relative to its course over the control duration.

In corresponding methods, a second delay time can also be determined using models that model an operating behavior of the injection valve, and to which at least the first delay time and/or its course over the control duration is supplied as input quantity. Particularly advantageously, the model is additionally also provided with the control duration and with further operating parameters such as fuel pressure, temperature, and the like, in particular in the context of the explained special operating mode.

For the diagnosis of the valve behavior of the injection valve or valves, in particular here for the determination of the just-explained first delay time, in addition a method can also be used in which a quantity characterizing the acceleration of a movable component of the electromagnetic actuator of the valve, in particular of its magnetic armature, is formed as a function of an electrical operating quantity of the electromagnetic actuator. From the quantity characterizing the acceleration, an operating state of the valve is inferred.

In particular, this method can be used to determine an actual hydraulic closing time at which the valve needle of the injection valve meets the valve seat.

As an electrical operating quantity of the electromagnetic actuator, for example an actuator voltage present at the magnetic coil, or a corresponding actuator current, can be used. As the quantity characterizing the acceleration of the magnetic armature, the first time derivative of the actuator voltage or of the actuator current is formed and used.

If the named operating conditions (in particular control durations, fuel pressure, injection pattern including pause times between injections, and a possible ramping of the controlling, and the fuel temperature) are known or are set in a defined manner, corresponding methods can be carried out much more quickly and reliably. Extensive computational extrapolations, or a simulation in correspondingly expensive models, can be at least partly omitted.

The acquisition at the valve of the quantities characterizing the valve behavior, and a corresponding evaluation, enable particularly reliable inferences regarding the valve behavior that go well beyond a pure acquisition of a deviation from linearity, as known from the existing art via the acquisition of a lambda value.

In the context of such diagnostic methods, it turns out in particular to be advantageous if defined injection patterns and fuel pressures are preset using the explained control parameters that are particularly relevant for the respective diagnostic method. A simultaneous monitoring of relevant boundary conditions, i.e. of operating parameters, ensures a capacity to run the engine in the respective mode taking into account the requirements with regard to drivability, combustion behavior, and emissions. Impermissible, i.e. errored, measurement or diagnostic results due to impermissible boundary conditions are advantageously avoided.

The method according to the present invention can also include continuous monitoring, during regular engine operation, of the relevant operating conditions, in particular the influencing factors that cannot be influenced, and to require the special operating mode only when the named influencing factors are within a permissible range for the respective diagnosis. Influencing factors that can have negative effects on the recognition quality of a corresponding diagnostic method can be permitted or excluded in a targeted manner. In particular, this can relate to other diagnostic methods, and/or e.g. a so-called bad road recognition for recognizing a state of a roadway.

If the bad road recognition reports for example a bad state of a roadway, the resulting vibrations can cause a valve behavior that does not correspond to normal operation. This can be avoided in a targeted manner if in this case a diagnosis is prevented. The method according to the present invention can in particular include a so-called collision management, in the context of which injections are displaced as needed in such a way that relevant parameters, such as pause times between injections, are situated in a permissible range for the recognition method. This procedure also optimizes the measurement conditions for the respective diagnostic method.

The methods explained here can be carried out in parallel on all cylinders, or can be carried out individually for each cylinder. A corresponding additional injection can be applied arbitrarily, and can be for example also made in torque-neutral fashion. This includes a carrying out of the additional injection(s) during all the angular areas of the engine operation, i.e. during the intake, compression, exhaust, and power stroke.

In other words, a method according to the present invention includes for example first an observation or monitoring of boundary conditions. This can also include a determination of whether a measurement of a valve is required at all. As a further criterion, it is determined whether relevant operating parameters are valid, i.e. for example no error is present of a pressure sensor, an injection valve end stage, or a temperature sensor. In addition, it is for example determined whether engine load and engine rotational speed are in a range in which a valve measurement makes sense, whether cross-influences (e.g. a poor roadway state) are present that would have a negative influence on the measurement, and/or e.g. whether the fuel or valve temperature is in a range in which a measurement should be carried out.

On the basis of these boundary conditions, i.e. operating states, it is determined whether a measurement should take place. If this is the case, the engine is put into a special operating mode, e.g. through the selection of the fuel pressure for which the greatest urgency is present with regard to a measurement, and/or through the selection of the appropriate injection timing, and the diagnosis is carried out.

Regarding the features and advantages of the operating method also proposed according to the present invention, reference is made expressly to the features and advantages explained above.

The implementation of the present invention in the form of software is also advantageous because this results in particularly low costs, in particular if an executing control device is also used for further tasks and is therefore already present anyway. Suitable data carriers for providing the computer program include in particular diskettes, hard drives, flash memory devices, EEPROMs, CD-ROMs, DVDs, and others. A downloading of a program via computer networks (Internet, intranet, etc.) is also possible.

Further advantages and embodiments of the present invention result from the description and the accompanying drawing.

It will be understood that the features named above and those explained below may be used not only in the respectively indicated combination, but also in other combinations or by themselves, without departing from the scope of the present invention.

The present invention is presented on the basis of exemplary embodiments shown schematically in the drawing, and is described in detail below with reference to the drawing.

DETAILED DESCRIPTION

Figure 1:
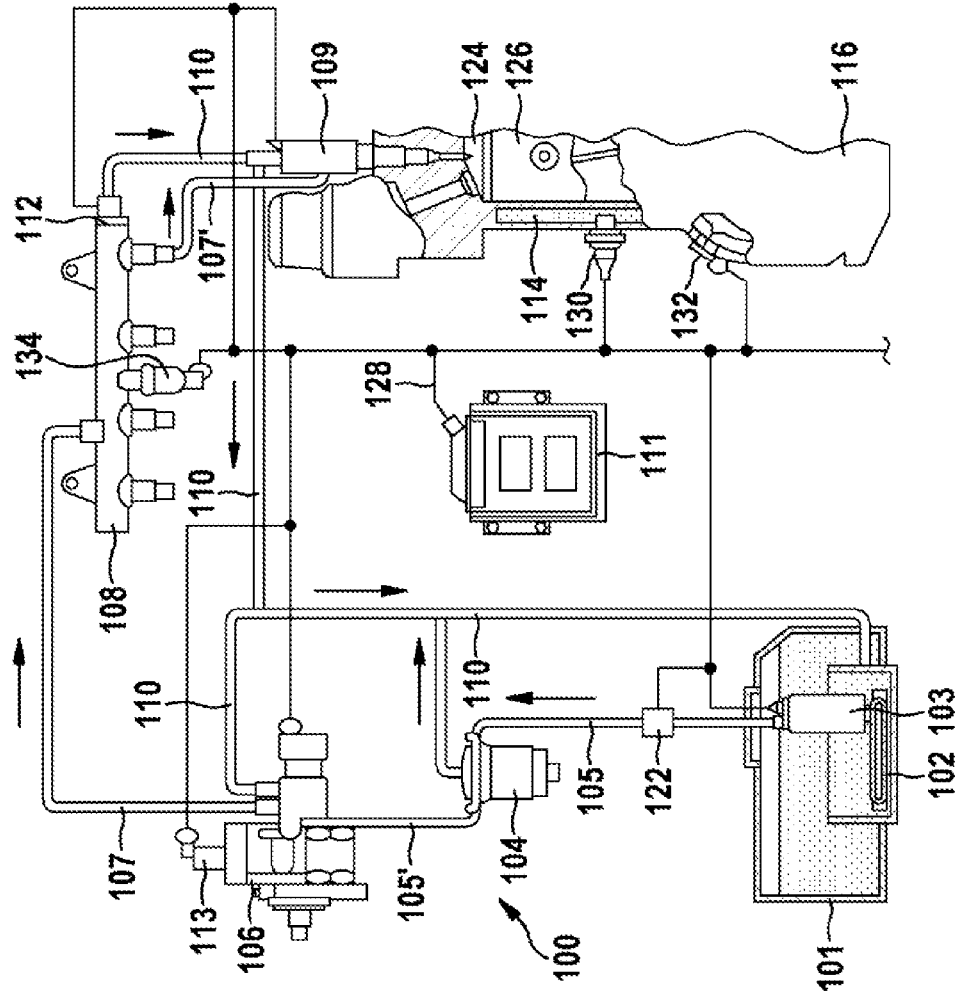
FIG. 1 schematically shows a common rail system on the basis of which the present invention is described.

FIG. 1 shows an internal combustion engine, here fashioned as a common-rail engine having direct injection, which can form the basis of the present invention. The solution according to the present invention is however equally applicable for example in spark-ignition engines and/or engines having intake-manifold fuel injection. The internal combustion engine includes a common-rail fuel injection system 100 and a cylinder 116.

A piston 126 is movably situated in a combustion chamber 124, shown in partial section and cooled with cooling water 114, of cylinder 116. An injection valve 109 is used to inject fuel into combustion chamber 124. Although here only one cylinder 116 is shown, the present invention is suitable for use in internal combustion engines having arbitrarily many cylinders, and the injection behavior of valves of one or more cylinders can be assessed.

The fuel injection system includes a fuel tank 101 that is shown in the almost full state. Inside fuel tank 101 there is situated a pre-conveyor pump 103 that suctions fuel from tank 101 through a pre-filter 102, and conveys it through a fuel line 105 up to a fuel filter 104 at a low pressure of from 1 bar to a maximum of 10 bar. From fuel filter 104, a further low-pressure line 105' leads to a high-pressure pump 106 that compresses the supplied fuel to a high pressure that, depending on the system, is typically between 100 bar and 2000 bar. The corresponding values in spark-ignition engines are typically between 35 bar and 250 bar. High-pressure pump 106 has a metering unit 113 for setting a fuel quantity. High-pressure pump 106 feeds the compressed fuel into a high-pressure line 107 and into a rail 108 (high-pressure storage device) connected thereto, the so-called common rail. From rail 108 a further high-pressure line 107' leads to injection valve 109.

A system of return lines 110 enables the return of excess fuel from fuel filter 104, high-pressure pump 106 or metering unit 113, injector 109 and rail 108 into fuel tank 101. Here, between rail 108 and return line 110 there is connected a pressure regulating valve 112, that, along with the metering unit, can regulate the high pressure, the so-called rail pressure, prevailing in rail 108 by modifying the quantity of fuel flowing from rail 108 into return line 110.

The overall common-rail injection system 100 is controlled by a control device 111 that is connected via electrical lines 128 inter alia to pre-conveyor pump 103, high-pressure pump 106, metering unit 113, injection valve 109, a pressure sensor 134 on rail 108, pressure regulating valve 112, and temperature sensors 130, 132, 122 on cylinder 116, or on fuel supply line 105. Further sensors or soft sensor devices (not shown) are provided for example for acquiring the voltage of the vehicle electrical network, and additional temperatures (e.g. the engine temperature, the fuel temperature, the fuel composition, the temperature of supplied fresh gas or of the exhaust gas), as well as the fuel pressure. Control device 111 is set up to carry out a method according to the present invention, in particular for setting the regular and/or special operating mode, as explained above.

Figure 2:
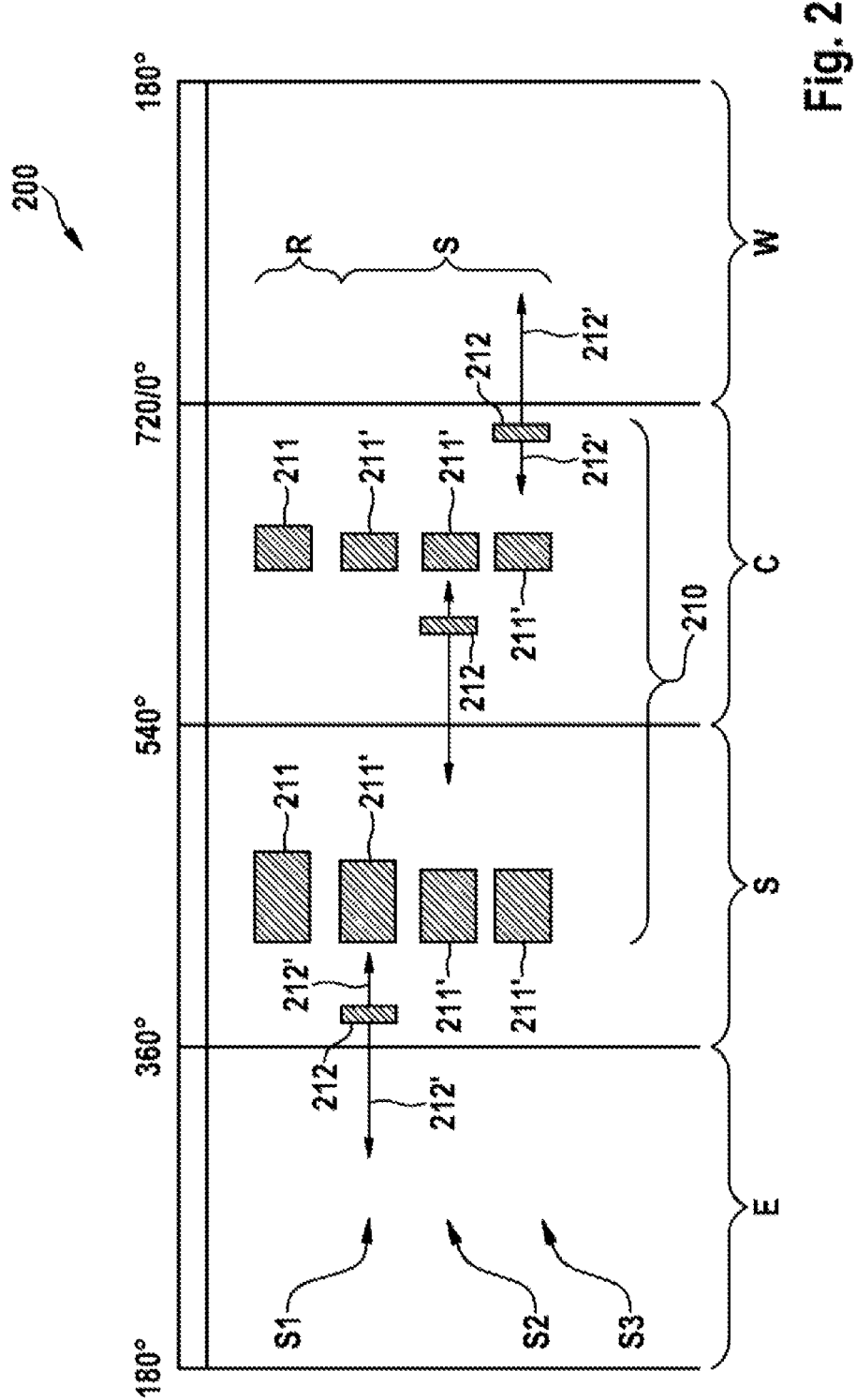
FIG. 2 shows control schemata for an internal combustion engine in a regular operating mode and in a special operating mode.

FIG. 2 shows control schemata for an internal combustion engine in a regular operating mode R and in a special operating mode S according to particularly preferred specific embodiments of the present invention. The control schemata are designated 200 overall and are plotted over a crankshaft angle in degrees. The representation is limited to one cylinder, but the described designs can be realized in an arbitrary number of cylinders.

E represents an exhaust stroke in a crankshaft angular range of from 180° to 360°. S designates an intake stroke in a crankshaft angular range of from 360° to 540°. C designates a compression stroke in a crankshaft angular range of from 540° to 720°, or 0°, and W designates a power stroke in a crankshaft angular range of from 0° to 180°. R designates a regular operating mode, and S (or, individually, S1 through S3) designates special operating modes.

Regular operating mode R and special operating modes S1 through S3 differ, inter alia, in the form of injection pattern 210 provided in each case. The injection shown in FIG. 2 takes place both in regular operating mode R and in special operating modes S1 through S3 in the form of a so-called split injection, having in each case two partial injections 211 or 211', of which one is made during intake stroke S and one is made during compression stroke C. The person skilled in the art will understand that the measures according to the present invention can be used with other injection schemata. Thus, the basis of the diagnosis does not have to represent a split injection; rather, a division of a regular injection into a main injection and a measurement injection can also take place. In certain cases, it can also be advantageous to carry out all the injections in the intake stroke or compression stroke, or in the form of a corresponding combination, or in other angular ranges. Here, it is also possible to make more than two or three injections.

According to a particularly preferred specific embodiment of the present invention, it is provided to carry out additional injections 212 during a special operating mode S1 through S3, in addition to the respective partial injections 211'. The quantity of fuel injected in additional injections 212 here advantageously reduces the quantity of the respective partial injections 211 of regular operating mode R, so that a reduced quantity of fuel results for each of the partial injections 211' of special operating mode S1 through S3. As is illustrated by arrows 212', partial injections 212 can in each case be extended or temporally displaced. Here, it is not necessarily required to correct the first, or only the first, regular injection by the measurement injection; arbitrary other injections can also be reduced.

According to a particularly preferred specific embodiment of the present invention, a diagnosis of the respective injection behavior is carried out during each of the partial injections 212, as explained above.

Figure 3:
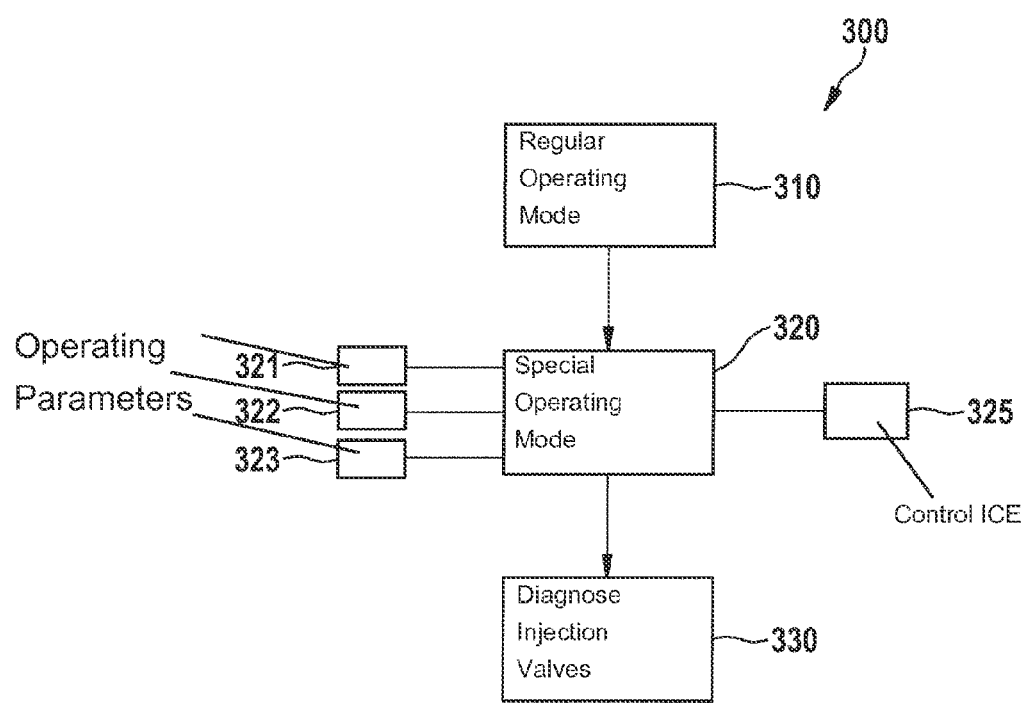
FIG. 3 shows a method according to a particularly preferred specific embodiment of the present invention, in a schematic representation.

FIG. 3 shows a method, designated 300 overall, of a particularly preferred specific embodiment of the present invention. In a first method step 310, the internal combustion engine runs in a regular operating mode R. Through the use of suitable control parameters, in a step 320 the internal combustion engine is put into a special operating mode S, as explained above. In special operating mode S, as mentioned, operating parameters 321 through 323 are acquired. An internal combustion engine is e.g. controlled in such a way, in a step 325, that the above-explained additional injections are made. Here, the fuel pressure can be taken into account (e.g. in the form of an OR connection), and as a result other diagnostic methods can also profit from the proposed measures, because the injection behavior is a function of pressure.

In a step 330, a diagnosis takes place of the respectively participating injection valves 109, and in each case during the at least one additional injection 212 a quantity characterizing the injection behavior of the at least one injection valve 109 is acquired at the valve.

What is claimed is:

1. A method for assessing an injection behavior of at least one injection valve of an internal combustion engine, the method comprising:
- guiding the internal combustion engine into a special operating mode defined by at least one control parameter, wherein the at least one control parameter includes at least one of a rail pressure and an injection pattern;
- operating the internal combustion engine in the special operating mode during a diagnostic time period;
- determining at least one operating parameter of the internal combustion engine at least during the diagnostic time period;
- acquiring at least one quantity characterizing the injection behavior of the at least one injection valve at least during a segment of the diagnostic time period; and
- evaluating the at least one quantity characterizing the injection behavior of the at least one injection valve on the basis of the at least one operating parameter.

2. The method as recited in claim 1, further comprising:
- performing at least one additional injection by the at least one injection valve;
- acquiring the at least one quantity characterizing the injection behavior of the at least one injection valve at the at least one injection valve at least during the at least one additional injection;
- evaluating the at least one quantity characterizing the injection behavior of the at least one injection valve on the basis of the at least one operating parameter.

3. The method as recited in claim 2, wherein:
- the injection pattern includes at least one main injection and at least one additional injection,
- a quantity of fuel injected overall by the at least one main injection and by the at least one additional injection corresponds to a regular injection quantity.

4. The method as recited in claim 2, wherein the injection pattern includes a main injection as a split injection having at least two partial injections, and an additional injection.

5. The method as recited in claim 2, further comprising:
- performing an additional injection during at least one of an intake stroke, a compression stroke, an exhaust stroke, and a power stroke, in the form of at least one of a pre-injection and a post-injection.

6. The method as recited in claim 1, wherein:
- the at least one operating parameter includes at least one of a voltage of a vehicle electrical network, a fuel pressure, a rail pressure, an injection pattern that is used, a pause time between two injections, a fuel type, an engine load, an engine rotational speed, an operating mode of the internal combustion engine, a torque reserve of the internal combustion engine, and a temperature of at least one of a fresh gas, an exhaust gas, a fuel, and the at least one injection valve.

7. The method as recited in claim 1, further comprising:
- acquiring at least one delay time of the at least one injection valve as the at least one quantity characterizing the injection behavior of the at least one injection valve.

8. The method as recited in claim 1, wherein the at least one quantity characterizing the injection behavior of the at least one injection valve includes at least one of a control voltage to control the at least one injection valve, a control current determined during the controlling of the injection valve, a first time derivative of the control voltage, and a first time derivative of the control current.

9. The method as recited in claim 6, wherein the internal combustion engine is put into the special operating mode only when the at least one determined operating parameter lies at least partly within a specified range.

10. The method as recited in claim 1, wherein the at least one control parameter is the rail pressure.

11. A method for operating an internal combustion engine, comprising:
- carrying out an assessment of at least one injection behavior of at least one injection valve of the internal combustion engine according to a method for assessing the injection behavior of the at least one injection valve of the internal combustion engine, the method comprising:
    - guiding the internal combustion engine into a special operating mode defined by at least one control parameter, wherein the at least one control parameter includes at least one of a rail pressure and an injection pattern;
    - operating the internal combustion engine in the special operating mode during a diagnostic time period;
    - determining at least one operating parameter of the internal combustion engine at least during the diagnostic time period;
    - acquiring at least one quantity characterizing the injection behavior of the at least one injection valve at least during a segment of the diagnostic time period; and
    - evaluating the at least one quantity characterizing the injection behavior of the at least one injection valve on the basis of the at least one operating parameter.

12. The method of operating an internal combustion engine of claim 11, wherein the at least one control parameter is the rail pressure.

13. A computing unit that is set up to carry out a method for assessing an injection behavior of at least one injection valve of an internal combustion engine, the method comprising:
- guiding the internal combustion engine into a special operating mode defined by at least one control parameter, wherein the at least one control parameter includes at least one of a rail pressure and an injection pattern;
- operating the internal combustion engine in the special operating mode during a diagnostic time period;
- determining at least one operating parameter of the internal combustion engine at least during the diagnostic time period;
- acquiring at least one quantity characterizing the injection behavior of the at least one injection valve at least during a segment of the diagnostic time period; and
- evaluating the at least one quantity characterizing the injection behavior of the at least one injection valve on the basis of the at least one operating parameter.

14. The computing unit that is set up to carry out a method for assessing an injection behavior of at least one injection valve of an internal combustion engine of claim 13, wherein the at least one control parameter is the rail pressure.

* * * * *